United States Patent
Wang et al.

(10) Patent No.: US 9,160,524 B2
(45) Date of Patent: Oct. 13, 2015

(54) METHOD AND SYSTEM FOR RECOVERING CRYPTOGRAPHIC OPERATIONS AND/OR SECRETS

(75) Inventors: Xinyuan Wang, Clifton, VA (US); Xin Li, Fairfax, VA (US)

(73) Assignee: GEORGE MASON UNIVERSITY, Fairfax, VA (US)

( * ) Notice: Subject to any disclaimer, the term of this patent is extended or adjusted under 35 U.S.C. 154(b) by 196 days.

(21) Appl. No.: 13/462,637

(22) Filed: May 2, 2012

(65) Prior Publication Data
US 2012/0284532 A1    Nov. 8, 2012

Related U.S. Application Data (60) Provisional application No. 61/481,463, filed on May 2, 2011.

(51) Int. Cl.
  *G06F 12/14* (2006.01)
  *H04L 9/06* (2006.01)
  *G06F 21/60* (2013.01)

(52) U.S. Cl.
  CPC ............ *H04L 9/0637* (2013.01); *G06F 21/602* (2013.01); *G06F 2221/2143* (2013.01)

(58) Field of Classification Search
  CPC .............................. G06F 12/1408; G06F 21/72
  USPC .................................................. 713/190, 189
  See application file for complete search history.

(56) References Cited

U.S. PATENT DOCUMENTS

| | | | |
|---|---|---|---|
| 8,201,065 B1* | 6/2012 | Cheong et al. | 714/795 |
| 2003/0009694 A1* | 1/2003 | Wenocur et al. | 713/201 |
| 2009/0013019 A1* | 1/2009 | Tapster et al. | 708/250 |
| 2011/0246768 A1* | 10/2011 | Mahmud et al. | 713/167 |
| 2011/0296198 A1* | 12/2011 | Motoyama | 713/189 |

OTHER PUBLICATIONS

"Announding the Advanced Encryption Standard (AED)", Federal Information Processing Standards Publication 197, Dated Nov. 26, 2001,downloaded from http://csrs.nist.gov/publications/fips/fips197/fips-197.pdf (52 pages).

"Data Encryption Standard (DES)", Federal Information Processing Standards Publication, FIPS PUB 46-3, U.S. Department of Commerce/National Institute of Standards and Technology, Reaffirmed Oct. 25, 1999, downloaded from http://csrs.nist.gov/publications/fips/fips46-3/fips46-3.pdf (26 pages).

"Announcing the Secure Hash Standard", Federal Information Processing Standards Publication 180-2, (+ Change Notice to Include SHA-224), dated Aug. 1, 2002, downloaded from http://csrs.nist.gov/publications/fips/fips180-2/fips180-2withchangenotice.pdf (83 pages).

(Continued)

*Primary Examiner* — Anthony Brown
(74) *Attorney, Agent, or Firm* — Eckert Seamans Cherin & Mellott, LLC; Carol A. Marmo

(57) ABSTRACT

A computerized system and method for identifying one or more cryptographic operations from software code, comprising: performing processing associated with identifying, one or more cryptographic operations in the software code, the software code being run on a processor; and performing processing associated with identifying a boundary for each cryptographic operation in the software code.

24 Claims, 11 Drawing Sheets

(56) References Cited

OTHER PUBLICATIONS

"Welcome to the OpenSSL Project", downloaded from http:www.openssl.org/, on Nov. 20, 2012 (1 page).
"Ultimate Packer for eXecutables", downloaded from http://upx.sourceforge.net/, on Jul. 25, 2014 (3 pages).
Boaz Barak et al., On the (Im)possibilty of Obfuscating Programs (Extended Abstract); in proceedings of the 21st Annual International Cryptology Confrecne on Advances in Cryptology (CRYPTO 2001) (2001) (18 pages).
David Brumley et al., "Remote Timing Attacks are Practical", In Proceedings of the 12th USENIX Securit Symposium, San Diego, CA, USA, Aug. 2003 13 pages.
Juan Caballero et al., "Polygot: Automatic Extraction of Protocol Message Format Using Dynamic Binary Analysis", CCS'07, Oct. 29-Nov. 2, 2007, pp. 317-329.
Juan Caballero et al., "Dispatcher: Enabling Active Botnet Infiltration Using Automatic Protocol Reverse-Engineering", CCS'09, Nov. 9-13, 2009, pp. 621-634.
Suresh Chari et al., "Towards Sound Approaches to Counteract Power-Analysis Attacks", CRYPTO'99, LNCS 1666, pp. 398-412 (1999).
Paolo Milani Comparetti et al., "Prospex: Protocol Specification Extraction", In Proceedings of the 2009 IEEE Symposium on Security and Privacy (S&P 2009), May 2009 (16 pages).
Paolo Milani Comparetti et al., "Identifying Dormant Functionality in Malware Programs", In Proceedings of the 2010 IEEE Symposium on Security and Privacy (S&P 2010), May 2010 (16 pages).
Jean-Sebastien Coron, "A New DPA Countermeasure Based on Permutation Tables", SCN 2008, LNCS 5229, pp. 278-292 (2008).
Manuel Egele et al., "Dynamic Spyware Analysis", In Proceedings of the 2007 USENIX Annual Technical Conference (ATC 2007), pp. 233-246, Jun. 2007.
Karine Gandolfi et al., "Electromagnetic Analysis: Concrete Results", Cryptographic Hardware and Embedded Systesm (CHES 2001), Lecture Notes in Computers Science, vol. 2162, pp. 251-261, May 2001.
J. Alex Halderman et al., "Lest We Remember: Cold Boot Attacks on Encryption Keys", In Proceedings of 17th USENIX Security Symposium, pp. 45-60, Aug. 2008.
Xuxian Jiang et al., ""Out-of-the-Box" Monitoring of VM-Based High-Interaction Honeypots", In Proceedings of the 10th International Symposium on Recent Advance in Intrusion Detection (RAID 2007), Sep. 2007 (20 pages).
Xuxian Jiang et al., "Stealthy Malware Detection Through VMM-Based "Out-of-the-Box" Semantic View Reconstruction", CCS'07, Oct. 29-Nov. 2, 2007 (11 pages).
J. Jonsson et al., "Public-Key Cryptograhpy Standards (PKCS) #1: RSA Cryptography Specfications Version 2.1", Feb. 2003, (72 pages), Downloaded from http://tools.ierf.org/html/rfc3447.
S. Kent et al., "Security Architecture for the Internet Protocol", Dec. 2005, (101 pages), Downloaded from http://tools.ierf.org/html/rfc4301.
Paul C. Kocher, "Timing Attacks on Implementations of Diffie-Hellman, RSA, DSS, and Other Systems", In Proceedings of the 16th Annual Internationl Cryptology Conference on Advances in Cryptology (CRYPTO 1996), pp. 104-113 (1996).
Paul C. Kocher et al., "Differential Power Analysis", In Proceedings of the 19th Annual Internationl Cryptology Conference on Advances in Cryptology (CRYPTO 1999), pp. 388-397 (1999).

Clemens Kolobitsch et al., "Inspector Gadget: Automated Extraction of Proprietary Gadgets from Malware Binaries", In Proceedings of the 2010 IEEE Symposium on Securityand Privacy (S&P 2010), May 2010 (16 pages).
Zhiqiang Lin et al., "Automatic Protocol Format Reverse Engineering through Context-Aware Monitored Execution", In Proceedngs of the 15th Network and Distributed System Secuirty Symposium (NDSS 2008), Feb. 2008 (17 pages).
Zhiqiang Lin et al., "Automatic Reverse Engineering of Data Structures from Binary Execution", In Proceedings of the 17th Nework and Distributed System Secuirty Symposium (NDSS 2010), Feb. 2010 (18 pages).
Cullen Linn et al., "Obfuscation of Executable Code to Improve Resistance to Static Disassembely", In Proceedings of the 10th ACM Conference on Computer and Commuications Security (CCS 2003), Oct. 27-30, 2003 (10 pages).
Alfred J. Menezes et al., "Handbook of Applied Cryptography", CRC Press, copyright 1996 (794 pages).
Andreas Moser et al., "Exploring Multiple Execution Paths for Malware Analysis", In Proceedings of the 2007 IEEE Symposium on Security and Privacy (S&P 2007), pp. 231-246, May 2007.
Nicholas Nethercote et al., "Valgrind: A Framework for Heavyweight Dynamic Binary Instrumentation", In Proceedings of the 2007 ACM SIGPLAN Conference on Programming Langauge Design and Implementation (PLDI 2007), Jun. 11-13, 2007 (12 pages).
James Newsome et al., "Dynamic Taint Analysis for Automatic Detection, Analysis, and Signature Generation of Exploits on Commodity Software", In Proceedings of the 12th Network and Distributed Systems Security Symposium (NDSS 2005), Feb. 2005 (17 pages).
Torbjorn Pettersson, "Cryptographic Key Recovery From Linux Memory Dumps", Computer Forensics, in Presention, Chaos Communication Camp, Aug. 2007, Saved Apr. 19, 2007 (14 pages).
Matthieu Rivain et al., "Provably Secure Higher-Order masking of AES", In Proceedings of the 12th Interantional Conference on Cryptographic Hardware and Embedded Systems (CHES 2010), pp. 431-427 (2010).
R.L. Rivest et al., "A Method for Obtaining Digital Signatures and Public-Key Cryptosystems", Communications of the ACM, vol. 21, No. 2, pp. 120-126, Feb. 1978.
Bruce Schneier, "Description of new Variable-Length Key, 64-Bit Block Cipher (Blowfish)", In Proceedings of the First Fast Software Encryption Workshop, pp. 191-204, Dec. 1993.
Monirul Sharif et al., "Impeding Malware Analysis Using Conditional Code Obfuscation", In Proceedings of the 15th Network and Distributed Systems Security Symposium (NDSS 2008), Feb. 2008 (13 pages).
Sharath K. Udupa et al., "Deobfuscation Reverse Engineering Obfuscated Code", In Proceedings of the 12th Working Conference on Reverse Engineering (WCRE 2005), Nov. 2005 (10 pages).
Zhi Wang et al., "ReFormat: Automatic Reverse Engineering of Encrypted Messages", In Proceedings of the 14th European Symposium on Resarch in Computer Security (ESORICS 2009), LNCS 5789, pp. 200-215, Sep. 2009.
Heng Yin et al., "Panorama: Capturing System-Wide Information Flow for Malware Detection and Anaysis", In Proceedings of the 14th ACM Conference on Computer and Commuications Security (CCS 2007), pp. 116-127, Oct. 29-Nov. 2, 2007.

* cited by examiner

TAINT CONTRIBUTION RATE BETWEEN BUFFERS

FIGURE 7

```
1:  for each f_i do
2:      j ← 0
3:      k ← 8
4:      if j + k ≤ m then
5:          calculate S
6:          if S is empty then
7:              continue
8:          else
9:              for each k-byte buffer x in S do
10:                 if a_{j+k} doesn't taint every byte in x the
11:                     mark buffer a[j, j + k) as a block
12:                     j ← j + k
13:                     goto 4
14:                 end if
15:             end for
16:             k ← k + 1
17:             goto 4
18:         end if
19:     end if
20:     if at least one block is identified then
21:         break
22:     end if
23: end for
```

RECOVERING BLOCK CIPHERS

FIGURE 8A

1: $j \leftarrow 0$
2: $k \leftarrow 8$
3: if $j + k \leq m$ then
4:    calculate $S$
5:    if $S$ is empty then
6:       $j \leftarrow j + 1$
7:       goto 3
8:    else
9:       for every buffer $b$ in $S$ do
10:          for $l = j + k \to m - 1$ do
11:             if NOT $a_l$ taints every byte in $b$ then
12:                break
13:             end if
14:          end for
15:          mark buffer $b$ as the hash of buffer $a[j,l]$
16:       end for
17:    end if
18: end if

FIGURE 8B

```
void XYZ_Enc_ECB(char *input, char *output, KEY *key)
{
  initialization;
  for each block input_block in input
  { pre-block handling;
    XYZ_Encrypt_Block(input_block, output_block, key);
    post-block handling;
  }
}
```

SKETCH IMPLEMENTATION OF XYZ's ENCRYPTION IN ECB MODE

FIGURE 10

DIFFERENT PATTERNS OF THE AVALANCHE EFFECT BETWEEN A CRYPTOGRAPHIC HASH, A STREAM CIPHER AND A BLOCK CIPHER FUNCTIONS

FIGURE 11

| Mode of Operation | Encryption | Decryption |
|---|---|---|
| ECB | ⟨1:n⟩ | ⟨1:n⟩ |
| CBC | ⟨1:n, 1:n, 1:n, ...⟩ | ⟨1:n, 1:1⟩ |
| CFB | ⟨1:1, 1:n, 1:n, ...⟩ | ⟨1:1, 1:n⟩ |
| OFB | ⟨1:1⟩ | ⟨1:1⟩ |

PATTERNS OF THE AVALANCHE EFFECT OF DIFFERENT MODES OF OPERATION

US 9,160,524 B2

METHOD AND SYSTEM FOR RECOVERING CRYPTOGRAPHIC OPERATIONS AND/OR SECRETS

CROSS-REFERENCED TO RELATED APPLICATIONS

This application claims the benefit of U.S. Provisional Application No. 61/481,463, filed May 2, 2011. The foregoing application is incorporated by reference in its entirety.

DETAILED DESCRIPTION

Software analysis, forensics, and reverse engineering seek to understand the inner workings of software. With respect to malware, this may help defend against malware. To prevent themselves from being analyzed and reverse engineered, software and malware often use cryptographic algorithms to protect their code and communications. To prevent the in-memory cryptographic secrets from being recovered by searching tools, software may make the cryptographic secrets transient (e.g., existing in memory for a short time period) by encrypting or destroying the secrets immediately after using them at runtime. In addition, multiple rounds of encryption may be utilized.

Figure 1:
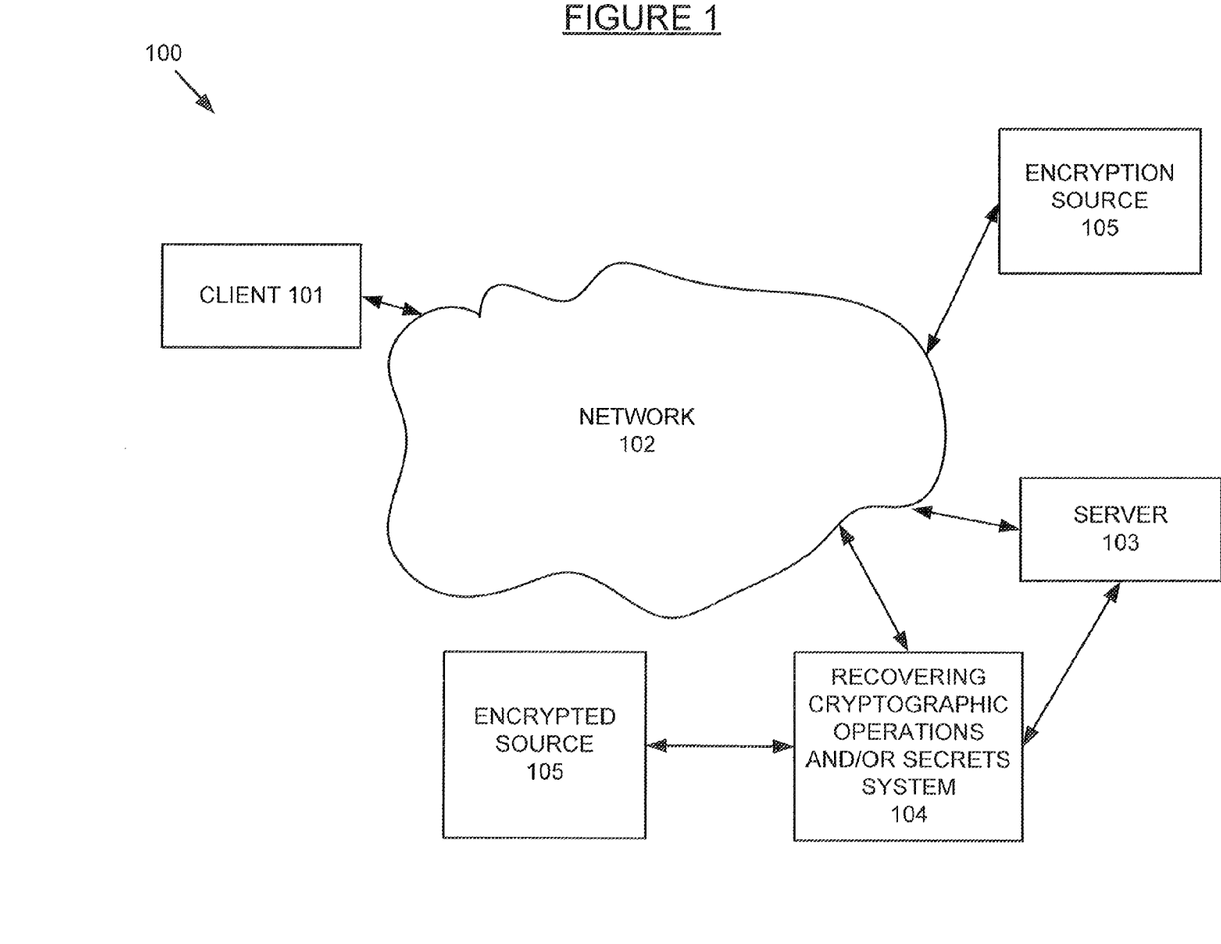
FIG. 1 illustrates a system for recovering cryptographic operations and/or secrets, according to an embodiment.

FIG. 1 depicts a system 100 for recovering cryptographic operations and/or secrets, according to an embodiment of the invention. A cryptographic operation may comprise: a public key cryptographic algorithm, a block cipher, a stream cipher, or a hash, or any combination thereof. System 100 may comprise a network 102 that may allow communication between a client 101, server 103, encryption sources 105, and recovering cryptographic operations and/or secrets system 104.

A user at client 101 may access system 104 over a network 102 via server 103. Encryption sources 105 may store information of existing software that may be provided to the system 104. The type of information stored in encryption sources 105 may include various types of software programs (e.g. malware, versions of a software program, media editing programs, web browsers, etc.).

Network 102 may comprise any type of wired or wireless communication channel capable of sharing information between nodes. This may comprise: a local area network, a wide area network, the Internet, or a combination of networks.

The term "server" as used throughout this disclosure may refer generally to a computer, other device, program, or combination thereof that processes and responds to the requests of remote users across a communications network. Servers may serve their information to requesting "clients." The term "client" as used herein may refer generally to a computer, other device, program, or combination thereof that is capable of processing and making requests and obtaining and processing any responses from servers across a communications network.

Encryption sources 105 may comprise computer storage media. Computer storage media may comprise volatile and nonvolatile, removable and non-removable media implemented in any method or technology for storage of information such as computer readable instructions, data structures, program modules, or other data. Computer storage media includes, but is not limited to, RAM, ROM, EEPROM, flash memory, or other memory technology, CD-ROM, DVD, or other optical storage, magnetic cassettes, magnetic tape, magnetic disk storage or other magnetic storage devices, or any other medium which can be used to store the desired information and which can be accessed by client 101 and server 103. Any of the encryption sources 105, may be part of client 101, server 103, or exist separately.

Figure 2:
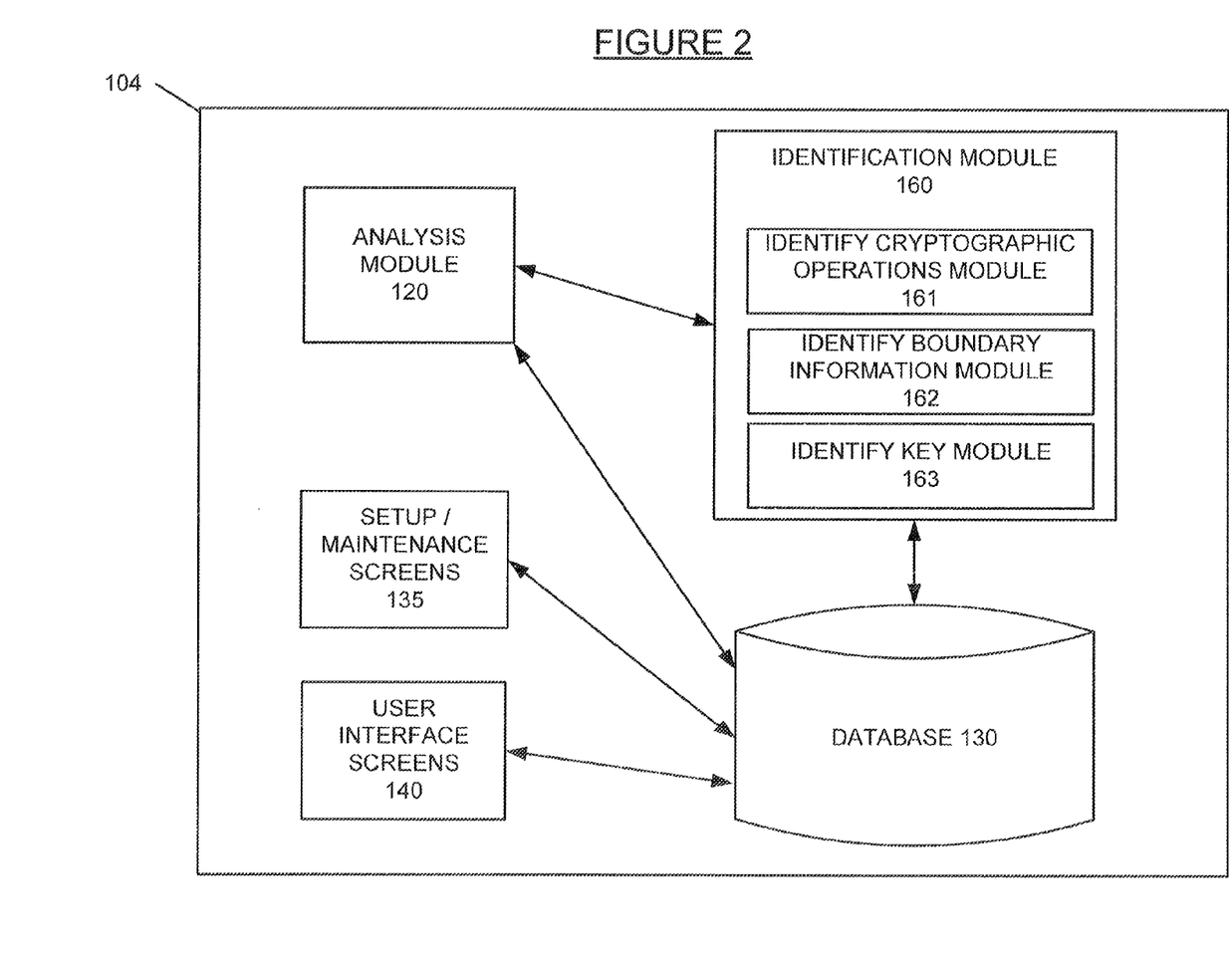
FIG. 2 illustrates modules comprised in the system for recovering cryptographic operations and/or secrets, according to an embodiment.

FIG. 2 depicts modules comprised in system 104, according to an embodiment of the invention. System 104 may comprise: database 130, setup/maintenance screens 135, user interface screens 140, a dynamic binary analysis module 120, or an offline analysis identification module 160, or any combination thereof. The binary analysis module 120 may generate run-time information relating to tainted information. (Note that the binary analysis module 120 may be run offline and/or online (e.g., dynamically).) The identification module 160 may identify cryptographic operations, boundary information, key information, or any combination thereof. (Note that the identification module 160 may be run offline and/or online (e.g., dynamically).) The identification module 160 may comprise an identify cryptographic operations module 161, an identify boundary information module 162, or an identify key module 163, or any combination thereof.

Figure 3:
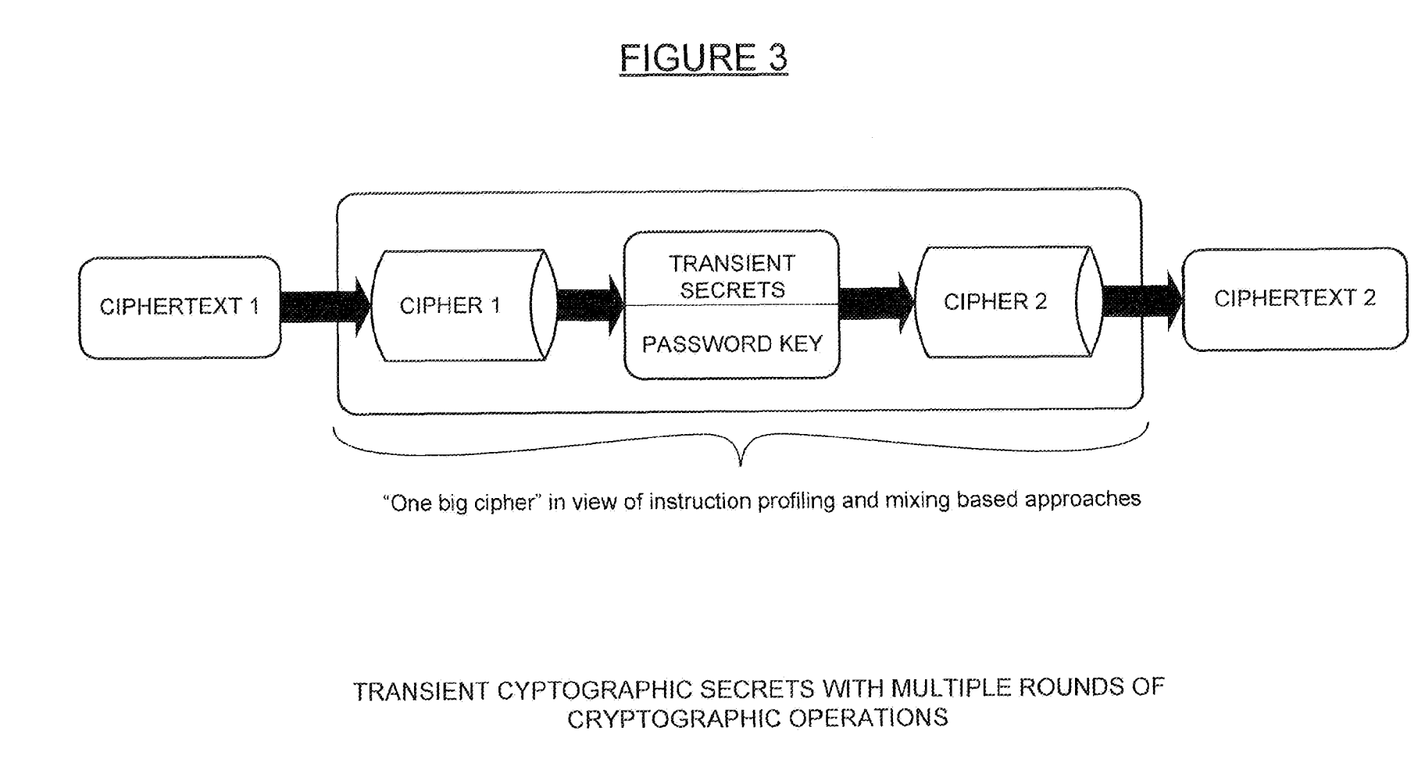
FIG. 3 illustrates a transient cryptographic operation (e.g., secret) within multiple rounds of other cryptographic operations, according to an embodiment.

FIG. 3 illustrates a transient cryptographic operation (e.g., secret) within multiple rounds of other cryptographic operations, according to an embodiment. Nested cipher 1 and cipher 2 are shown as one big cipher.

Figure 4:
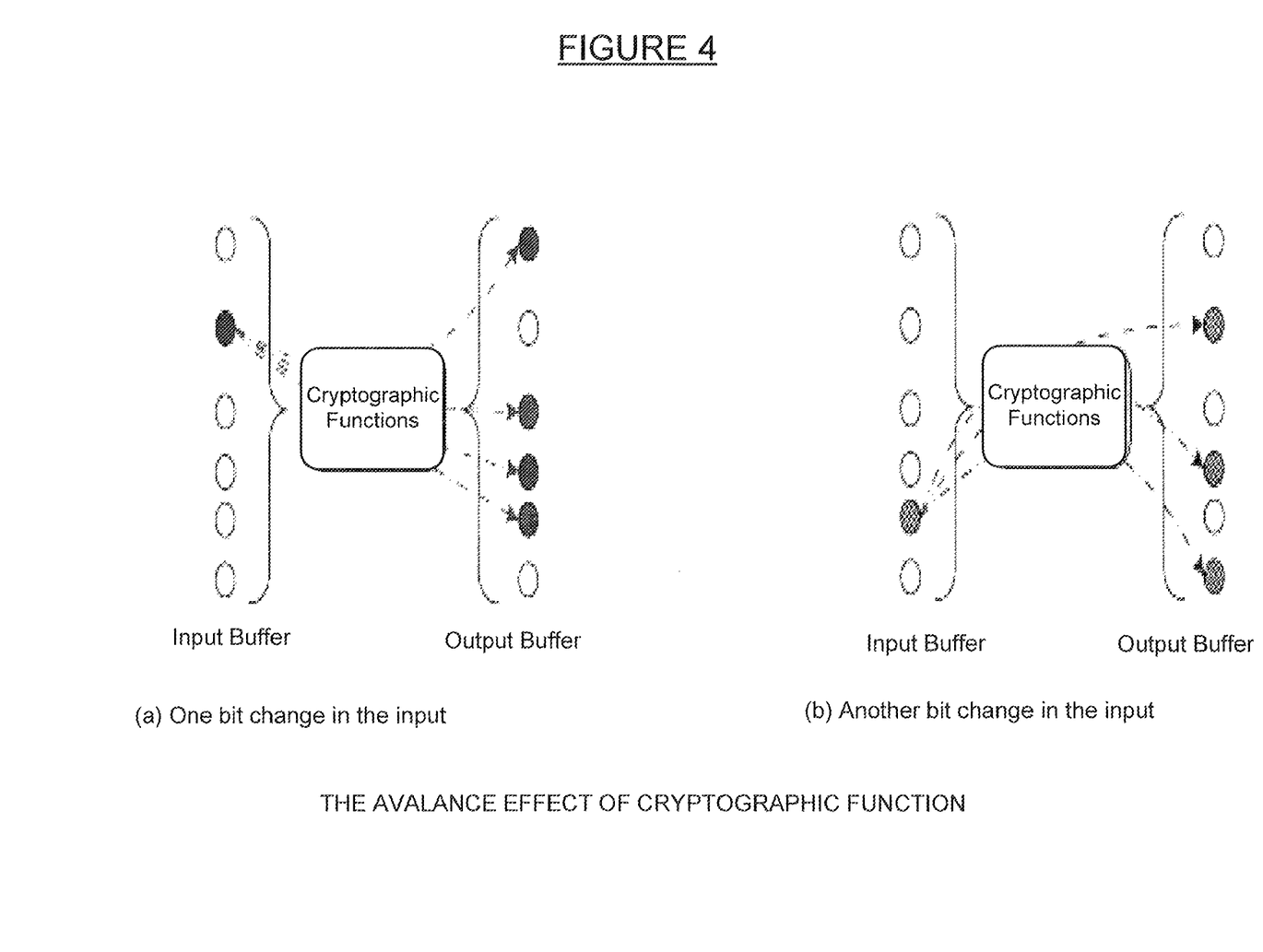
FIGS. 4 and 6 illustrate avalanche effect information, according to some embodiments.

FIG. 4 illustrates an avalanche effect, according to an embodiment. The avalanche effect refers to the desirable property of cryptographic algorithms (e.g., public key cryptographic algorithms, symmetric cryptographic algorithms, hash functions) where a slight change (e.g., flipping a single bit) in the input causes significant changes (e.g., half the output bits flip) in the output. Non-cryptographic operations rarely display the avalanche effect. Thus, the avalanche effect may be a defining characteristic of some cryptographic functions.

Another feature of the avalanche effect is that is may allow accurate pinpointing of the location, size and boundary of input and output buffers. In FIG. 4, (a) and (b) illustrate the avalanche effect on the output buffer by changing two different bits in the input buffer. Note that, in (a), changing one bit in the input changes half the output. Similarly, in (b), changing another bit in the input changes half the output. While changing different bits in the input buffer results in different bits changed in the output buffer, the changed bits are cohesive within the fixed output buffer.

It can be determined whether or not a software operation displays an avalanche effect. Any manner of determining whether or not a software operation displays an avalanche effect may be used. In one embodiment, the following process, where the input is changed and the output change is tracked, may be used: Let m≥1 and n≥1 be the number of bytes of the input and the output of the cryptographic function, respectively. Because of the avalanche effect, any single bit change in the input may cause 4n bits changed in the output. Those changed 4n bits in the output may be called "touched" by the bit change in the input. Assume the 4n bits in the output touched by any bit in the input are random and independent from each other; then no more than $(8n)/(2^x)$ bits in the output would remain untouched after x>1 different bit changes in the input. In other words, changing 8 different bits in the input of a good cryptographic function may leave no more than half bit untouched in a 128-bit output.

For example, in one embodiment, given the location of buffers a and b, one can measure the impact of buffer a to buffer b by repeatedly changing different bits in buffer a and comparing the corresponding results in buffer b. This method, however, may not be practical when the location of the input and the output buffers is unknown. Due to potential inherent randomness (e.g., using real-time clock value as seed), different runs of one executable may generate different internal states and outputs with exactly the same input. Therefore, in another embodiment, in order to detect where there is an avalanche effect, it may be useful to be able to measure the impact between any two chosen buffers with only one run of a given binary executable.

In this embodiment, a particular section of an operation may be tainted and tracked to determine whether or not there is any avalanche effect. Thus, if any bit in memory impacts any other bit in memory during the binary execution, then there must exist information flow between those two bits. If the information flow from a given source may be tracked, the impact between the memory buffers may be measured and the avalanche effect may be detected with a single run of the binary executable.

Figure 5:
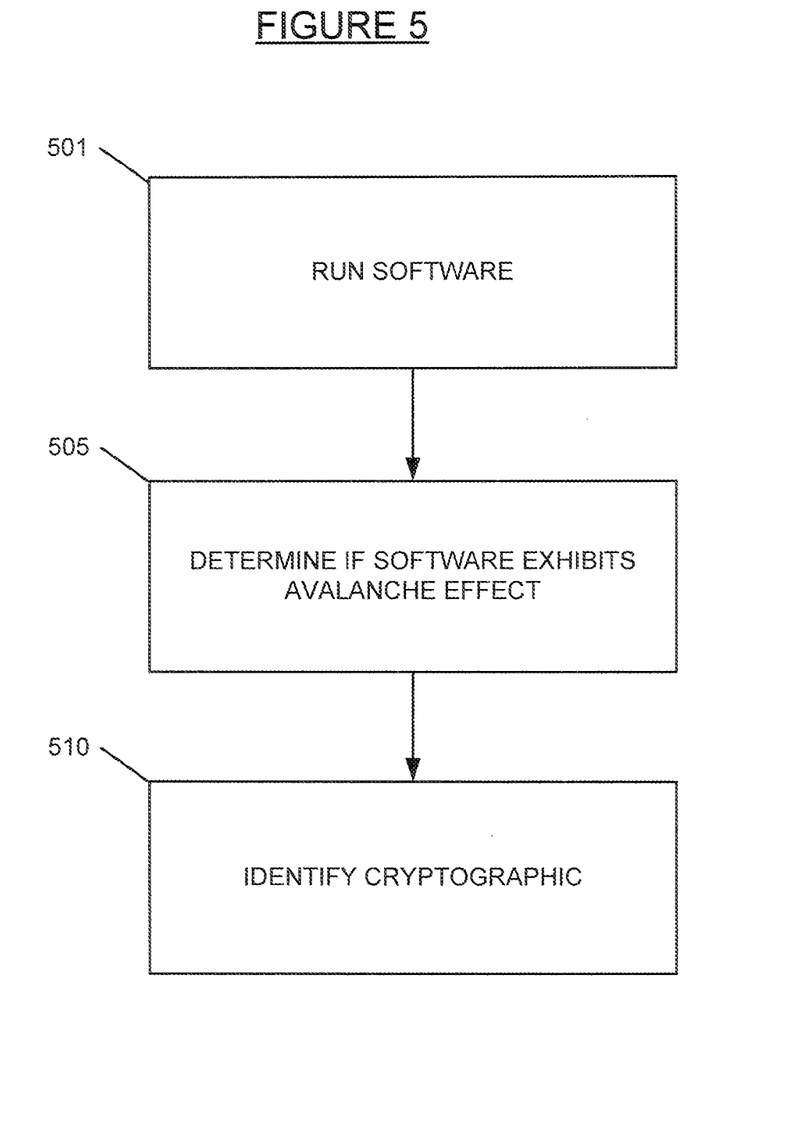
FIG. 5 illustrates a method of identifying a cryptographic operation, according to an embodiment.

FIG. 5 illustrates a method of identifying a cryptographic operation, according to an embodiment. In 501, the software (e.g., malware, binary executable) may be intercepted and run so that valuable information may be collected. For example, once a taint source (e.g., information received from the network or a file, certain memory locations) has been chosen, the propagation of the taint (e.g., any memory, register that has been impacted by the chosen taint source), and the address and value of the bytes involved in the taint propagation may be tracked and recorded. In 505, it can be determined whether the software exhibits an avalanche effect. For example, the recorded run-time information from the taint propagation may be analyzed and checked for patterns of instruction and memory access for any avalanche effect. Cryptographic function implementation often stores the input, the output, and the key in continuous memory buffers due to efficiency considerations. Thus, the avalanche effect between any two given continuous memory buffers of certain sizes may be identified. For example, the avalanche effect may be determined as follows: Given two continuous buffers a[0, . . . m−1] of m bytes and b[0, . . . n−1] of n bytes, if the information flow from any byte a[i] (i∈[0, . . . m−1] touches one or more bytes in buffer b[0, . . . n−1], it can be said that a[i] taints bytes in buffer b[0, . . . n−1]. If there exists the avalanche effect from buffer a[0, . . . m−1] to buffer b[0, . . . n−1], then any bit in buffer a[0, . . . m−1] should taint about 4n random bits in buffer b[0, n−1]. In addition, the bits in buffer b[0, . . . n−1] tainted by each bit in buffer a[0, . . . m−1] should be cohesive within buffer b[0, . . . n−1]. In other words, any byte a[i] may leave no more than $(8n)/(2^8)=n/32$ bits untainted in buffer b[0, . . . n−1]. The probability that any byte a[i] would leave one byte in buffer b[0, . . . n−1] untainted is:

$$\left[\frac{\binom{8n-8}{4n}}{\binom{8n}{4n}}\right]^8 < \left(\frac{1}{2}\right)^{64} (n \geq 2).$$

Therefore, if there exists the avalanche effect from the m-byte buffer a to the n-byte buffer b, then every byte in buffer a would taint virtually every byte in buffer b.

To quantitatively measure the avalanche effect between two buffers, C(a, m, b, n) may be used to denote the buffer a's m-th contribution rate to the n-byte buffer b, which may be defined as the portion of the first n bytes of buffer b that may be tainted by every byte from the first m bytes of buffer a. C(a, m, b, n)≈100% if and only if there exists the avalanche effect from the first m bytes of buffer a to the first n bytes of buffer b.

Figure 6:
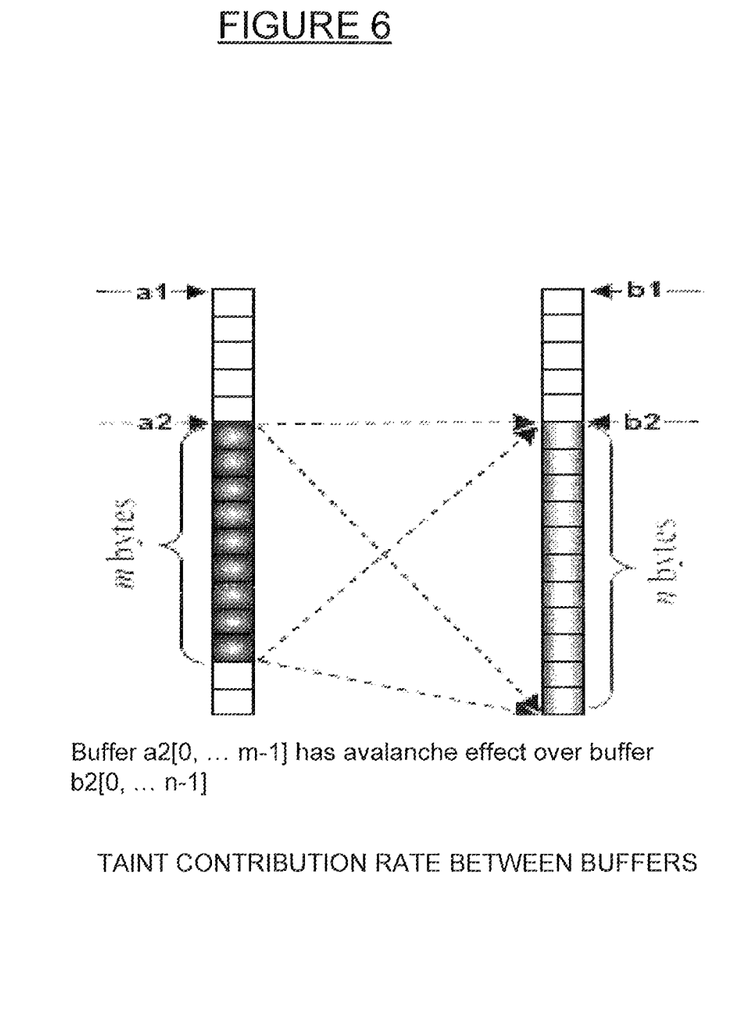

For example, FIG. 6 shows that the m-byte buffer pointed by pointer a2 has avalanche effect over the n-byte buffer pointed by pointer b2. Therefore, C(a2, m, b2, n) will be about 100%. Because the bytes between pointers a1 and a2 do not have avalanche effect to buffers b1[1, . . . , n−1] and b2[0, . . . , n−1], both C(a1, m, b1, n) and C(a1, m, b2, n) will be close to zero. On the other hand, C(a2, m, b1, n)≈[(n−(b2−b1)/n], where n≥b2−b1, as buffer a2[0, . . . m−1] does not have avalanche effect over memory region b1[0, . . . b2−b1+1} but over memory region b2 [0, . . . n−(b2−b1)+1].

Therefore, if there exists avalanche effect from buffer a[0, . . . m−1] to buffer b[0, . . . n−1], the right values of a, m, b, and n that make C(a, m, b, n)≈100% may eventually be found by trying different values of a, m, b, and n. This may allow accurate pinpointing of the location, size, and boundary of both the input and the output buffers of cryptographic functions.

In an embodiment, when searching for the avalanche effect, the bytes that have taint relationships may need to be considered and aggregated together. This may allow the search to be efficiently completed.

One challenge in identifying the avalanche effect is that the location and the size of the input buffer of the cryptographic operation is unknown. To pinpoint the input buffer, any memory region and the input sources (e.g., file input and network input) which could potentially contain the input buffer of the cryptographic operation may be tainted and the execution of the binary may then be monitored. The execution history may be viewed as a sequence of routine invocations ordered by their completion time.

For example, if $f_1, f_2, \ldots, f_n$, is the sequence of routine invocations in which for any i, $f_{i+1}$ completes right after $f_i$. For each routing invocation $f_i$, a set $B_1$ may be constructed, which may contain those tainted buffers that have been updated in or are still alive when $f_i$ completes. The run-time information collected may contain the snapshot of the value of tainted buffers, and thus may still be useful even if the cryptographic input or key have been destroyed right after being used inside any $f_i$. For each $B_i$, every continuous buffer a in set $B_i$ may be used as a potential input buffer, and every continuous buffer b in sets $B_{i+1}$, $B_{i+2}$, ..., $B_n$, as the potential output buffer, respectively. By applying the metrics described above, the avalanche effect between any two continuous buffers a and b may be detected. Due to the nature of the avalanche effect the input buffer and the output buffer of the cryptographic operation may be correlated (if there is any correlation), and the exact range of the input buffer and the output buffer may be discovered even if part of buffers a and b are not involved in the cryptographic operation.

Referring back to FIG. 5, in 510, based on the detected avalanche effect patterns, cryptographic operations may be identified and the location, size and boundary of the initialization vector (IV) buffer, the input buffer, the output buffer, and any key buffer involved in each of the identified cryptographic operations, and the time when the input, the output and the key (if any) will be in their corresponding buffers, may be determined.

Figure 7:
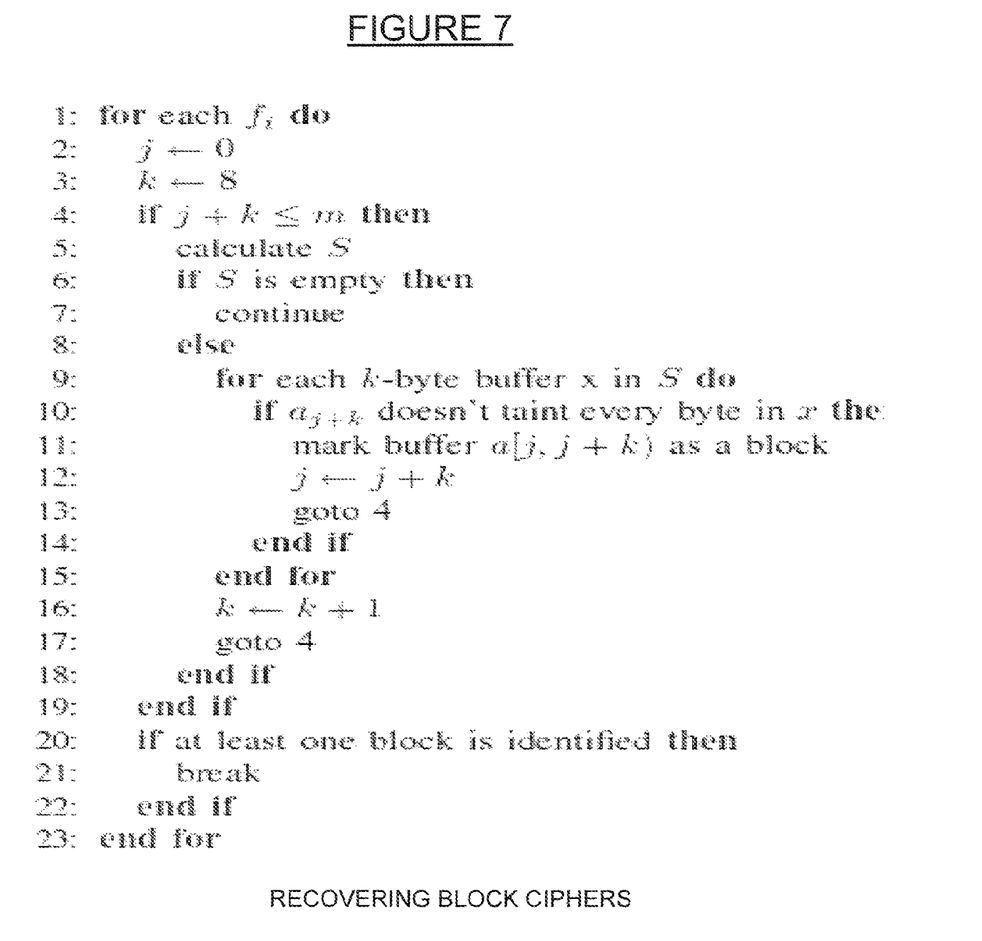
FIG. 7 illustrates an algorithm for identifying and recovering the input and the output of block ciphers, according to an embodiment.

Thus, given a continuous buffer a of m bytes, the following algorithms may be used to detect whether buffer a contains the input of a cryptographic operation and if yes, further discover boundary of the input and output buffers. FIG. 7 illustrates a high level algorithm for identifying and recovering the input and the output of block ciphers. Specifically, the avalanche effect at each routing completion $f_i$ may be examined. A small portion of buffer a from offset j with a length of k may be examined. The set S may be defined as the intersection of buffers which are: 1) no less than k bytes, 2) tainted by bytes $a_j$, $a_{j+1}$, ... $a_{j+k-1}$ at $f_i$. The algorithm may stop either when there is a block cipher cryptographic operation identified and all of its corresponding input and output blocks are recovered, or when all routing invocations are checked and there is no block cipher identified.

Figure 8A:
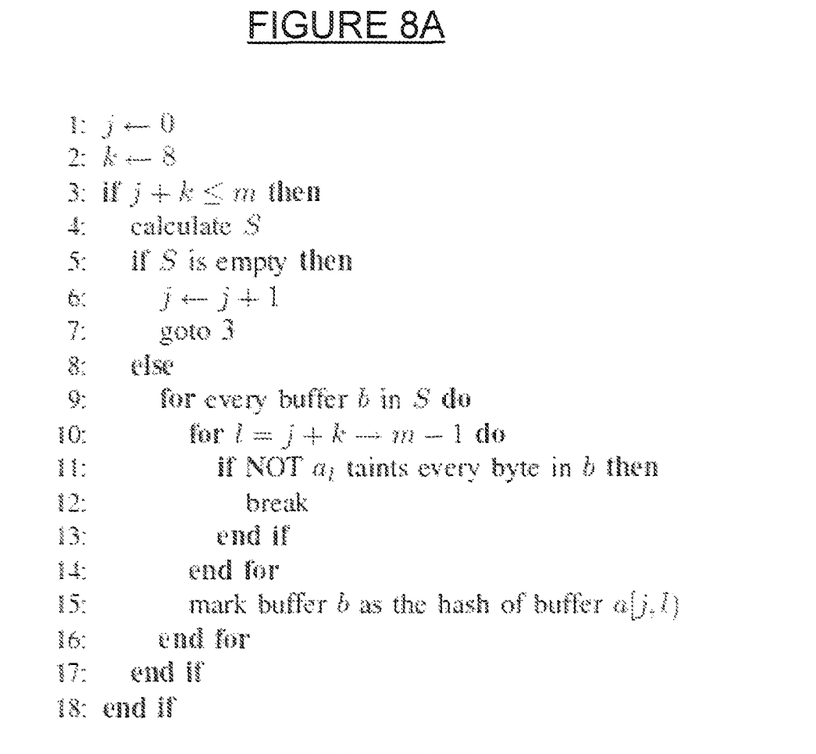
FIG. 8A shows an algorithm for a hash function, according to an embodiment.

Since a hash function exhibits different dataflow patterns than block cipher, the algorithm for a hash function, shown in FIG. 8A, may be slightly different from that for block ciphers. Recognizing that hash functions usually calculate the hash of a long buffer piece by piece, all routine invocations may be repeatedly checked. If there are more bytes which have 100% contribution to the hash buffer already identified, they may be aggregated into the input buffer. Once the potential hash buffer is no longer alive or all routing invocations have been checked, this buffer may be considered as the final hash buffer.

Public key cryptographic operations may be handled by the same algorithm for hash function detection.

Once the location, size, and the boundary of the input and output buffers of the identified cryptographic operation have been pinpointed, the content of the input from the snapshot of the identified input buffer may be recovered right before it is consumed by the cryptographic operation and the content of the output from the snapshot of the identified output buffer may be recovered right after the cryptographic operation has finalized the output. The input and the output may be recovered even if the generated output overwrites the input buffer.

Figure 8B:
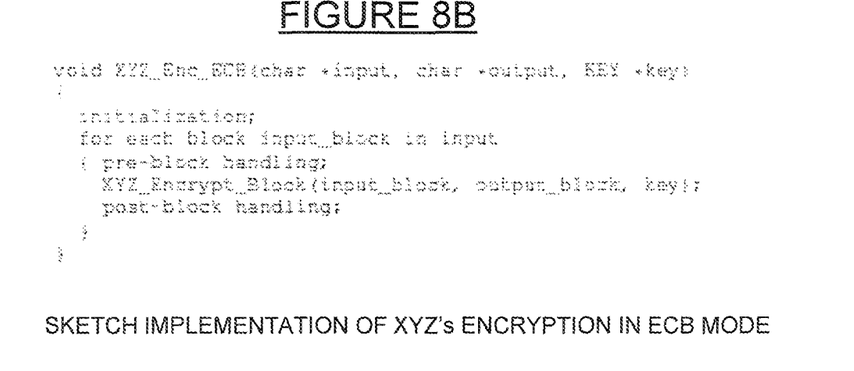
FIG. 8B shows a sketch implementation in ECB charging mode, according to an embodiment.

For example, assume there is a hypothetical general block cipher XYZ whose block size is 16 bytes. FIG. 8B shows the sketch implementation of XYZ's encryption in ECB chaining mode. The blockwise encryption may be done in function XYZ_Encrypt_Block( ). Assume the XYZ block cipher is used to encrypt a 32-byte plaintext buffer which is part of a larger buffer 1 in which the first several bytes are not the input to XYZ_Enc_ECB( ), and the corresponding cipertext is stored in buffer b. For the sake of simplicity, the plaintext may have exactly two blocks, so XYZ_Encrypt_Block( ) is invoked twice. Let $I_1$ and $I_2$ be the two invocations' completion points in the execution history.

Figure 9:
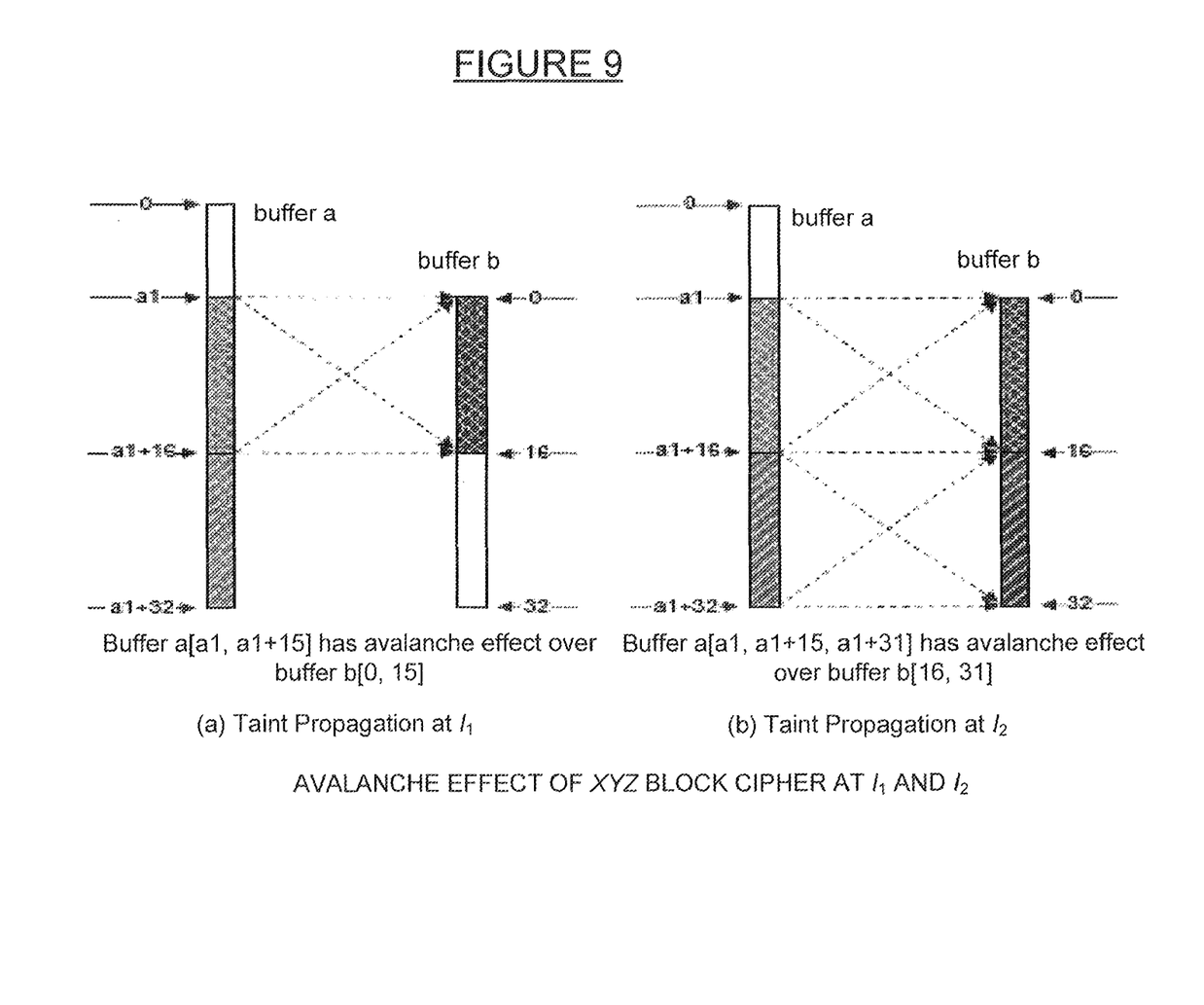
FIG. 9 illustrates the avalanche effect observed during execution of a block cipher encryption, according to an embodiment.

The avalanche effect observed during the execution of XYZ block cipher encryption is shown in FIG. 9. At $I_1$, as depicted in FIG. 9(*a*), when the algorithm of FIG. 7 is applied, no taint propagation to any part of buffer b may be detected until the byte at offset a1 is being examined. Since at $I_1$, the encryption of the first block a[a1, a1+15] completes, the avalanche effect from a[a1, a1+15] to b[0, 15] may be detected. Furthermore, a[a1+16, a1+31] doesn't taint any part of buffer b, so the algorithm marks buffer a[a1, a1+15] as a block.

The algorithm may then continue at $I_2$. In FIG. 9(*b*), after the second block of the plaintext is encrypted, a new instance of avalanche effect from the plaintext to the ciphertext may be added. When the algorithm in FIG. 7 is applied, in addition to the previously detected block a[a1, a1+15], the new avalanche effect from buffer a[a1+16, a1+31] to buffer b[16, 31] may be detected and buffer a[a1+16, a1+31] and buffer b[16, 31] may be added as the new input block and output block respectively.

As a result, the algorithm in FIG. 7 may successfully identify the two block plaintext buffer and the corresponding cipher-text buffer. The information regarding the two buffers may be preserved for further processing to identify the mode and type of the block cipher operation.

The security of cryptography is based on the secrecy of the key used. In pure software implementation of cryptographic algorithms, the key may be somewhere in the memory at a certain time no matter how the key is derived or obtained. Once a cryptographic operation has been identified, it may be determined whether a key is involved. If yes, a key is involved, the key may be identified and recovered.

The key will exhibit the avalanche effect on the data output. However, there are other sources in the memory that could also have the avalanche effect on the data output, including one or any combination of the following:

The data input to some cryptographic algorithms (e.g., block cipher, hash).

The initialization vector used in the cryptographic operation.

Internal buffers used in the cryptographic operation.

Some static (or global) data (e.g., S-Box in AES) used in the cryptographic operation.

Intermediate results in key derivation.

In order to reliably recover the key, the key needs to be distinguished from the above listed "noise" sources. This may be done based on the avalanche effect pattern and data liveness analysis, using any one or any combination of the following:

The key may be distinguished from the data input: For a block cipher with multiple blocks of data input, the data input to the block cipher may be different for a different block. On the other hand, the same key may be used for each block.

The key may be distinguished from the initialization vector: For a block cipher with multiple blocks of data input, the initialization vector may be used for the first block only, while the key may be used for all blocks.

Distinguish the key from the internal buffers used in the cryptographic operation: While the life span of the internal buffers in a cryptographic operation is not more than the life span of the cryptographic operation, the life span of the key buffer should be more that the life span of the whole cryptographic operation.

Distinguish the key from the static (or global) data used in the cryptographic operation: Every byte of the key may impact the whole cryptographic output. On the other hand, any byte in the static data (e.g., S-Box in AES) that may be used in the cryptographic operation may impact only a small portion of the cryptographic output.

Distinguish the key from intermediate results in key derivation: For efficiency, the key may be derived once even if it is used many times. Even if the key may be derived repeatedly every time before the key is used, the buffer that has been updated most recently with a life span longer than the cipher operation may be chosen. In other words, the candidate key buffer that is closets in time to the start of the cipher operation may be chosen.

The type of cryptographic operations and their internals may also be detected. For example, is a cryptographic operation a hash or a cipher? If a cipher, is it a block cipher or a stream cipher? If a block cipher, what operation mode is it using? Is the cipher operation encryption or decryption?

The type may be differentiated using patterns of the exhibited avalanche effect, as these are different for different types. For example, a hash may be distinguished from a cipher. One of the differences between a hash function and a cipher is that the output size of a cryptographic hash function is fixed while the output size of a cipher corresponds to the input size. Therefore, one can determine that the identified cryptographic operation is not a cipher if the output is smaller than the input involved in the avalanche effect. If the identified cryptographic operation generates the output of fixed size with different inputs of different sizes, the cryptographic operation may likely be a hash.

Figure 10:
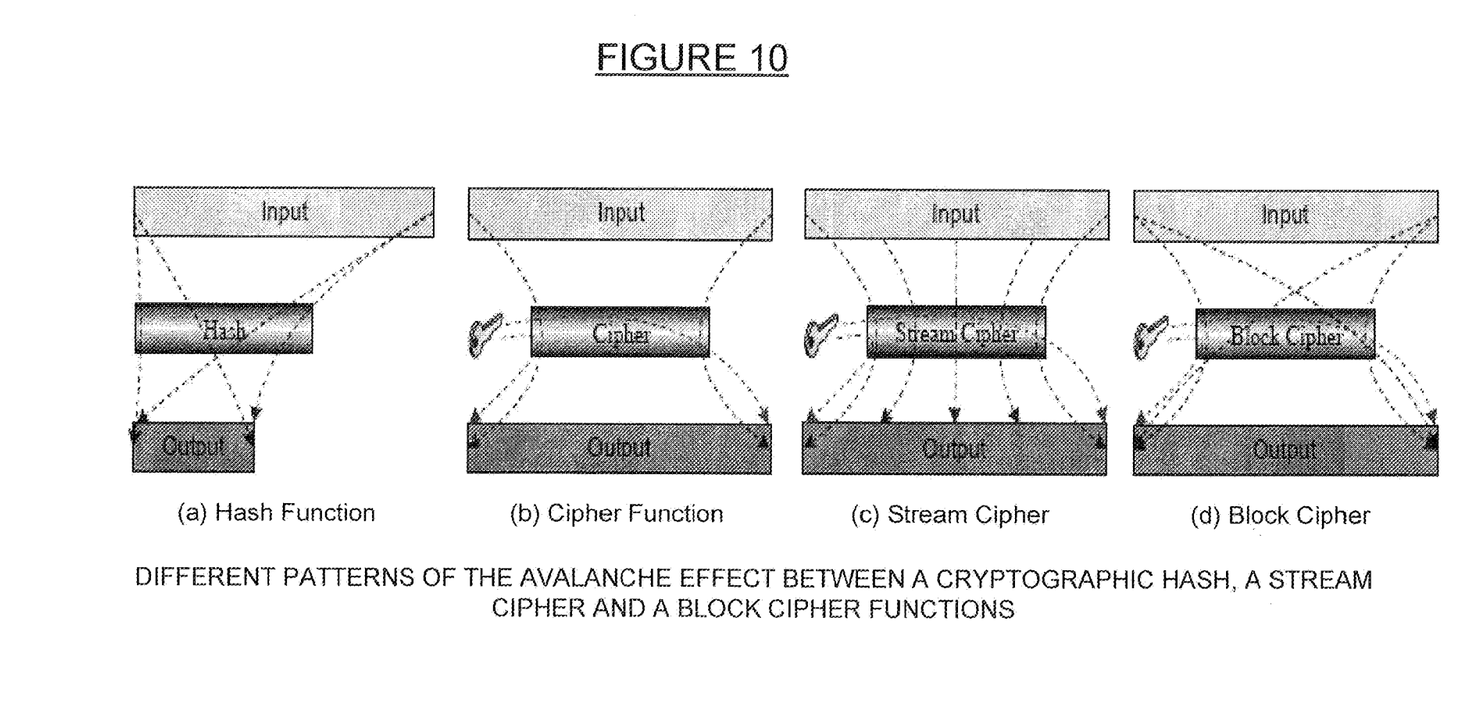
FIG. 10 illustrates examples of the different patterns of the avalanche effect between a hash function and a cipher, according to an embodiment.

Due to the avalanche effect, any byte in the hash input may impact almost all bytes in the hash output. Thus, if the identified cryptographic operation does not exhibit this pattern, it is likely not a hash. FIGS. 10($a$) and 10($b$) illustrate examples of the different patterns of the avalanche effect between a hash function and a cipher.

As another example, a stream cipher may be distinguished from a block cipher. A stream cipher may generate the ciphertext by combining (e.g., XOR) the cleartext with the pseudorandom bitstream generated from using the secret key. Therefore, any byte of the stream cipher input may impact only one byte of the stream cipher output of corresponding offset, and any byte in the key may impact the whole pseudorandom bitstream. In other words, the data input (e.g., cleartext) of a stream cipher has no avalanche effect on its data output (e.g., ciphertext) while its key input does. On the other hand, both the data input and the key input of a block cipher have the avalanche effect on its data output. This may enable distinguishing of a stream cipher from a block cipher by analyzing the information flow patterns. Note that certain operation modes (e.g., Integer Counter Mode) may turn a block cipher into a stream cipher. The block cipher in such an operation mode may be considered a stream cipher. FIGS. 10($c$) and 10($d$) show different patterns of the avalanche effect of a stream cipher and a block cipher.

In addition to distinguishing the different types of cryptographic operations, block cipher modes of operation may also be distinguished. When the input to a block cipher is longer than its block size, the input needs to be partitioned into multiple blocks before it is able to be processed by the block cipher. The block cipher mode of operation may determine how the block cipher operation may be applied to multiple blocks. Different modes of operation exhibit different patterns of the avalanche effect between the input blocks and the output blocks. This may provide a way to detect and differentiate the block cipher modes of operation.

For example, given input block $X[0, \ldots n-1]$ and output block $Y[0, \ldots, n-1]$, the pattern of the avalanche effect between them could be:

1:1—every byte $X[i]$ ($i \in [0, n-1]$) from the input block $X[0, \ldots, n-1]$ has 100% contribution rate to only byte $Y[i]$ in the output block $Y[0, \ldots, n-1]$.

A:n—every byte $X[i]$ ($i \in [0, n-1]$) from the input block $X[0, \ldots n-1]$ has 100% contribution rate to every byte $Y[j]$ ($j \in [0, n-1]$) in the output block $Y[0, \ldots, n-1]$.

Figure 11:
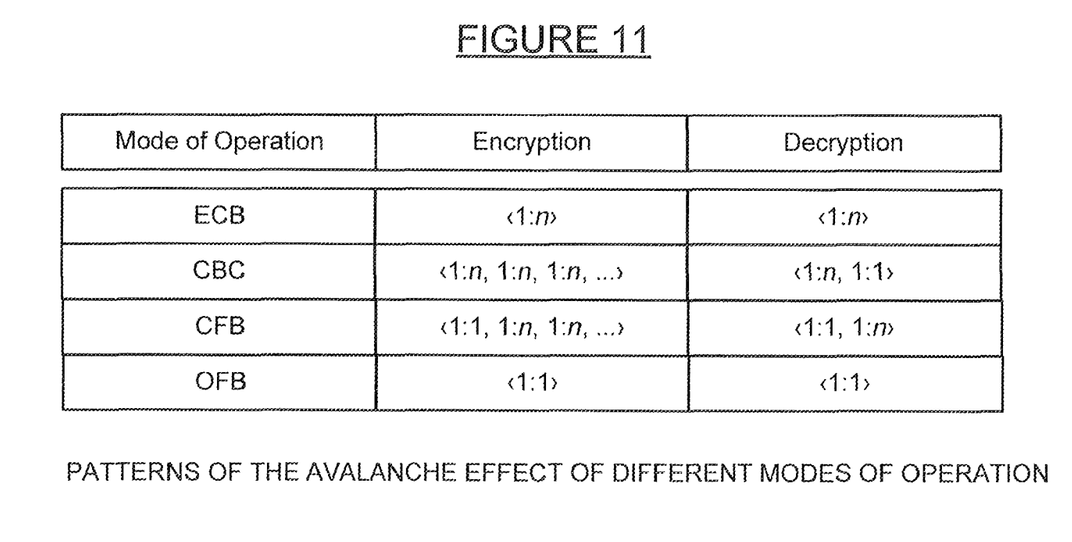
FIG. 11 illustrates under different modes of operation patterns of the avalanche effect, according to an embodiment.

FIG. 11 shows patterns of the avalanche effect between input blocks and output blocks under different modes of operation. For example, the encryption and decryption in Electronic Codebook (ECB) mode may have exactly the same pattern of the avalanche effect between the input blocks and the output blocks: <1: n>. Specifically, every byte in a given input block may impact every byte in the corresponding output block, and ti may have no impact on any other output block.

As another example, the pattern of Cipher Block Chaining (CBC) mode encryption may be <1:n, 1:n, 1:n, . . . > in that every byte in a given input block may impact every byte in the corresponding output block and all the subsequent output blocks. The pattern of the avalanche effect in CBC mode decryption may be <1:n, 1:1> in that every byte in a given input block may impact every byte in the corresponding output block and only one byte in the subsequent block.

As another example, the pattern of the avalanche effect in Cipher Feedback (CFB) mode encryption may be <1:1, 1:n, 1:n . . . > in that every byte in a given input block may impact only one byte in the corresponding output block and every byte in all subsequent output blocks. The pattern of the avalanche effect in CFB mode decryption, may be <1:1, 1:n> in that every byte in a given input block may impact only one byte in the corresponding output block and every byte in the subsequent output block.

As a further example, the encryption and decryption in output feedback (OFB) mode may have exactly the same pattern of the avalanche effect between the input blocks and output blocks: <1:1>. Specifically, every byte in a given input block may impact only one byte in the corresponding output block and it may have no impact on any other output block.

Therefore, different modes of operation may be distinguished based on the patterns of the avalanche effect as long as the block cipher input (and/or output) is not less than three blocks. For example, in an embodiment, no distinction may be made between block cipher in OFB (and CTR) mode and stream cipher since OFB (and CTR) mode does turn a block cipher into a stream cipher.

As FIG. 11 shows, the encryption and decryption of different modes may have different patterns of the avalanche effect. Thus, it can be determined whether a block cipher is encryption and decryption in some circumstances (e.g., if it is in CBC and/or CFB mode). For block cipher in ECB mode, the encryption and the decryption may have exactly the same pattern of the avalanche effect: <1:n>. Nevertheless, the encryption may be distinguished from the decryption in ECB mode as long as there exists any padding in the last block of the plaintext. Because the padding may be generated from the encryption code, it may have different sources of information flow than the "real" plaintext. The last block of the input to the block cipher encryption may be the padded plaintext, and the last block of the input to the block cipher description may be the ciphertext. Therefore, if the source of the input to the clock cipher is tainted, only part of the last block of the input (the plaintext) to the block cipher encryption may be tainted (the padding part may not be tainted), and the whole last block of the input (the ciphertext) to the block cipher decryption may be tainted. This may allow the encryption to be distinguished from the decryption for block ciphers in ECB mode.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

It should be noted that Applicant has, for consistency reasons, used the phrase "comprising" throughout the claims instead of "including, but not limited to". However, it should be noted that "comprising" should be interpreted as meaning "including, but not limited to".

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A computerized method for identifying at least one cryptographic operation from binary software code, comprising:
   performing processing associated with discovering and identifying, at least one cryptographic operation from execution of the binary software code, the binary software code being run on a processor;
   performing processing associated with discovering and identifying at least one buffer and at least one corresponding boundary for each identified cryptographic operation in the binary software code, the at least one buffer comprising: at least one initialization vector (IV) buffer, at least one input buffer, at least one output buffer, or at least one key buffer, or any combination thereof;
   performing processing associated with discovering and identifying at least one cryptographic secret, the at least one cryptographic secret being transient in memory, and/or comprising: at least one initialization vector (IV), cryptographic input, cryptographic output, or at least one cryptographic key; or any combination thereof; and
   performing processing associated with determining a start time and an end time for when a cryptographic secret of the identified cryptographic operation is in the at least one identified buffer.

2. The method of claim 1, further comprising:
   performing processing associated with recovering the at least one identified cryptographic operation; at least one mode of operation, or at least one order of execution, or any combination thereof.

3. The method of claim 1, wherein boundary information for each identified cryptographic operation is determined if the identified cryptographic operation is nested in between multiple other cryptographic operations.

4. The method of claim 2, wherein operation modes of at least one identified block cipher operation are identified, the operation modes comprising: electronic codebook (ECB), cipher block chaining (CBC), cipher feedback (CFB) or output feedback (OFB), or any combination thereof.

5. The method of claim 4, further comprising performing processing associated with determining whether the at least one identified block cipher operation is encryption or decryption.

6. The method of claim 1, wherein an avalanche effect is identified, the avalanche effect being a desired property of cryptographic function such that one bit change in the input or key causes significant change in the output.

7. The method of claim 6, wherein the avalanche effect is determined by: comparing different input and output; and/or using a taint analysis.

8. The method of claim 1, further comprising:
   performing processing associated with determining for each identified cryptographic operation: at least one location, at least one size, or at least one boundary, or any combination thereof of: the at least one IV buffer, the at least one input buffer, the at least one output buffer, or the at least one key buffer, or any combination thereof.

9. The method of claim 8, further comprising performing processing associated with determining whether at least one key is used in each identified cryptographic operation, and if so, performing processing associated with recovering the at least one key.

10. A computerized system for identifying one or more cryptographic operations from binary software code, comprising:
    a processor configured for:
    performing processing associated with discovering and identifying, at least one cryptographic operations from execution of the binary software code, the binary software code being run on a processor;
    performing processing associated with discovering and identifying at least one buffer and at least one corresponding boundary for each identified cryptographic operation in the binary software code, the at least one buffer comprising: at least one initialization vector (IV) buffer, at least one input buffer, at least one output buffer, or at least one key buffer, or any combination thereof;
    performing processing associated with discovering and identifying at least one cryptographic secret, the at least one cryptographic secret being transient in memory, and/or comprising: at least one initialization vector (IV), cryptographic input, cryptographic output, or at least one cryptographic key; or any combination thereof; and
    performing processing associated with determining a start time and an end time for when a cryptographic secret of the identified cryptographic operation is in the at least one identified buffer.

11. The system of claim 10, wherein the processor is further configured for:
    performing processing associated with recovering the at least one identified cryptographic operation; at least one mode of operation, or at least one order of execution, or any combination thereof.

12. The system of claim 10, wherein boundary information for each identified cryptographic operation is determined if the identified cryptographic operation is nested in between multiple other cryptographic operations.

13. The system of claim 11, wherein operation modes of at least one identified block cipher operation are identified, the operation modes comprising: electronic codebook (ECB), cipher block chaining (CBC), cipher feedback (CFB) or output feedback (OFB), or any combination thereof.

14. The system of claim 13, wherein the processor is further configured for determining whether the at least one identified block cipher operation is encryption or decryption.

15. The system of claim 10, wherein an avalanche effect is identified, the avalanche effect being a desired property of cryptographic function such that one bit change in the input or key causes significant change in the output.

16. The system of claim 15, wherein the avalanche effect is determined by: comparing different input and output; and/or using a taint analysis.

17. The system of claim 10, wherein the processor is further configured for:
performing processing associated with determining for each identified cryptographic operation: at least one location, at least one size, or at least one boundary, or any combination thereof of: the at least one IV buffer, the at least one input buffer, the at least one output buffer, or the at least one key buffer, or any combination thereof.

18. The system of claim 17, wherein the processor is further configured for performing processing associated with determining whether at least one key is used in each identified cryptographic operation, and if so, performing processing associated with recovering the at least one key.

19. The method of claim 1, wherein the at least one corresponding boundary comprises a start time and an end time for the at least one cryptographic operation.

20. The system of claim 10, wherein the at least one corresponding boundary comprises a start time and an end time for the at least one cryptographic operation.

21. The method of claim 1, wherein the boundary information comprises a start location and an end location of the at least one buffer.

22. The system of claim 10, wherein the boundary information comprises a start location and an end location of the at least one buffer.

23. The method of claim 8, performing processing associated with recovering at least one transient cryptographic secret of each identified cryptographic operation that will be immediately destroyed and/or encrypted after run-time use, the at least one transient cryptographic secret comprising: at least one transient IV, at least one input, at least one output, or at least one key, or at least one cryptographic secret, or any combination thereof.

24. The system of claim 17, performing processing associated with recovering at least one transient cryptographic secret of each identified cryptographic operation that will be immediately destroyed and/or encrypted after run-time use, the at least one transient cryptographic secret comprising: at least one transient IV, at least one input, at least one output, or at least one key, or at least one cryptographic secret, or any combination thereof.

* * * * *